US011928453B2

(12) United States Patent
Sato et al.

(10) Patent No.: US 11,928,453 B2
(45) Date of Patent: Mar. 12, 2024

(54) CONTROL METHOD, CONTROL DEVICE, AND SYSTEM

(71) Applicant: JIG-SAW INC., Sapporo (JP)

(72) Inventors: Daikazu Sato, Morioka (JP); Kazuhiro Ozuchi, Morioka (JP)

(73) Assignee: JIG-SAW INC., Sapporo (JP)

( * ) Notice: Subject to any disclaimer, the term of this patent is extended or adjusted under 35 U.S.C. 154(b) by 0 days.

(21) Appl. No.: 17/123,304

(22) Filed: Dec. 16, 2020

(65) Prior Publication Data

US 2021/0103440 A1  Apr. 8, 2021

Related U.S. Application Data

(63) Continuation of application No. PCT/JP2019/023344, filed on Jun. 12, 2019.

(30) Foreign Application Priority Data

Jun. 19, 2018 (JP) .................................. 2018-116353

(51) Int. Cl.
G06F 8/65 (2018.01)
G06F 8/61 (2018.01)
H04L 67/55 (2022.01)

(52) U.S. Cl.
CPC .................. *G06F 8/65* (2013.01); *G06F 8/61* (2013.01); *H04L 67/55* (2022.05)

(58) Field of Classification Search
CPC ... G06F 8/65; G06F 8/61; G06F 8/654; G06F 21/572; G06F 11/1433; G06F 3/123; H04L 67/26

See application file for complete search history.

(56) References Cited

U.S. PATENT DOCUMENTS 6,167,567 A   12/2000  Chiles et al.
8,869,138 B2  10/2014  Bandakka et al.
(Continued)

FOREIGN PATENT DOCUMENTS

JP   2003099278 A   4/2003
JP   2004178499 A   6/2004
(Continued)

OTHER PUBLICATIONS

International Search Report (PCT/ISA/210) dated Jul. 9, 2019, by the Japan Patent Office as the International Searching Authority for International Application No. PCT/JP2019/023344.
(Continued)

*Primary Examiner* — S. Sough
*Assistant Examiner* — Cheneca Smith
(74) *Attorney, Agent, or Firm* — BUCHANAN INGERSOLL & ROONEY PC

(57) ABSTRACT

A control method of a device, communicably connected to a control device, includes a rewriting control of firmware of the device. The rewriting control includes receiving a rewrite instruction of firmware of the device. The rewrite instruction includes first acquisition source information identifying an acquisition source of a script for rewriting firmware. The rewriting control further includes acquiring, based on a first acquisition source information, a script for rewriting firmware from an external device, and executing the script for rewriting firmware. By executing the script, acquisition of the firmware from an external device, control of the device so as to be in a state in which rewriting of firmware is enabled, transfer of the acquired firmware to the device, and rewrite of the firmware are performed.

19 Claims, 9 Drawing Sheets

(56) References Cited

U.S. PATENT DOCUMENTS

| | | | |
|---|---|---|---|
| 2003/0177208 A1 | 9/2003 | Harvey | |
| 2006/0236083 A1* | 10/2006 | Fritsch | H04W 8/22 713/1 |
| 2010/0242033 A1 | 9/2010 | Fritsch et al. | |
| 2015/0058834 A1* | 2/2015 | Chan | H04L 67/327 717/169 |
| 2017/0249164 A1* | 8/2017 | Petkov | G06F 3/0637 |
| 2017/0351508 A1* | 12/2017 | Jahn | G06F 8/654 |
| 2018/0136928 A1* | 5/2018 | Downum | G06F 8/654 |
| 2018/0173182 A1* | 6/2018 | Miller | H04W 4/00 |
| 2018/0365423 A1* | 12/2018 | Poppe | G06F 8/65 |
| 2019/0129658 A1* | 5/2019 | Matsuda | G06F 3/123 |

FOREIGN PATENT DOCUMENTS

| | | |
|---|---|---|
| JP | 2017111531 A | 6/2017 |
| WO | 2017154166 A1 | 9/2017 |

OTHER PUBLICATIONS

Written Opinion (PCT/ISA/237) dated Jul. 9, 2019, by the Japan Patent Office as the International Searching Authority for International Application No. PCT/JP2019/023344.

Extended European Search Report issued in corresponding European Patent Application No. 19 821 770.5, dated Jan. 27, 2022 (8 pages).

* cited by examiner

CONTROL METHOD, CONTROL DEVICE, AND SYSTEM

CROSS-REFERENCE TO RELATED APPLICATIONS

This application is a Continuation of International Patent Application No. PCT/JP2019/023344, filed Jun. 12, 2019, which claims the benefit of Japanese Patent Application No. 2018-116353, filed Jun. 19, 2018, both of which are hereby incorporated by reference herein in their entirety.

BACKGROUND OF THE INVENTION

Field of the Invention

The present invention relates to a control method, a control device, and a system.

Background Art

For process control and environment maintenance, a device equipped with a sensor and an input/output unit is arranged to collect data and control devices. Such a device is equipped with a CPU as a processor, processes data detected by the sensor and provides it to a server or the like, and controls input/output from/to an external device in accordance with a command. Data is processed by the CPU executing an instruction stored in firmware. One example of control for the device is firmware rewriting. PTL 1 describes that, as a method of changing the system program installed in the controlled device, a system program rewrite device stores a model information file, in which a procedure for transfer to the designated controlled device is described, and a rewriting system program, and exchanges data with the controlled device when the system program is updated.

In PTL 1, a program for each model is stored, and data is exchanged with the controlled device via a control network. However, when there are many kinds of devices whose programs are to be updated, it is required to store and distribute the program for each device. Therefore, the scale of the device becomes large. On the other hand, some of the microcomputer resources of the devices are small, so they may not be capable of having advanced functions such as device control using a network, for example, a firmware update procedure. Further, it is desired that a user who uses the device on site can easily control the device.

CITATION LIST

Patent Literature

PTL 1: Japanese Patent Laid-Open No. 2004-178499

SUMMARY OF THE INVENTION

In order to achieve the above-described problem, the present invention provides a control method of a device communicably connected to a control device by the control device, wherein the method includes a rewriting control of firmware of the device, the rewriting control including receiving a rewrite instruction of firmware of the device, the rewrite instruction including first acquisition source information identifying an acquisition source of a script for rewriting firmware, acquiring, based on the first acquisition source information, the script for rewriting firmware from an external device, and by executing the script for rewriting firmware, executing acquisition of the firmware from an external device, control of the device so as to be in a state in which rewriting of firmware is enabled, transfer of the acquired firmware to the device, and rewrite of the firmware of the device to the transferred firmware.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The appended drawings, which are included in and constitute part of the specification, illustrate embodiments of the present invention, and along with those descriptions serve to illustrate the principles of the present invention.

DESCRIPTION OF THE EMBODIMENTS

A preferred embodiment of the present invention will be described below with reference to accompanying drawings.

[System Configuration]

Figure 1:
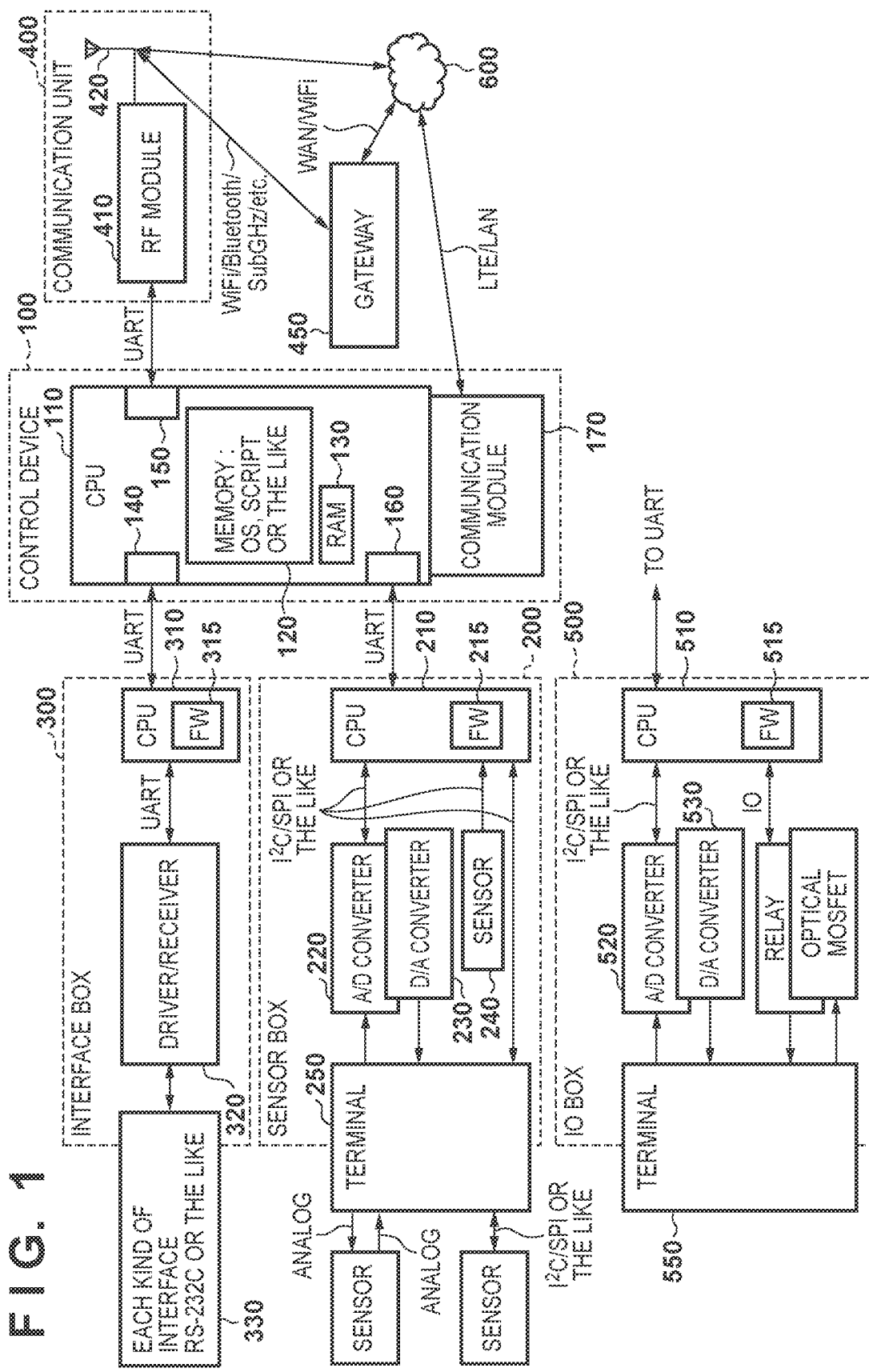
FIG. 1 is a view showing a configuration example of a system according to an embodiment.
Figure 2:
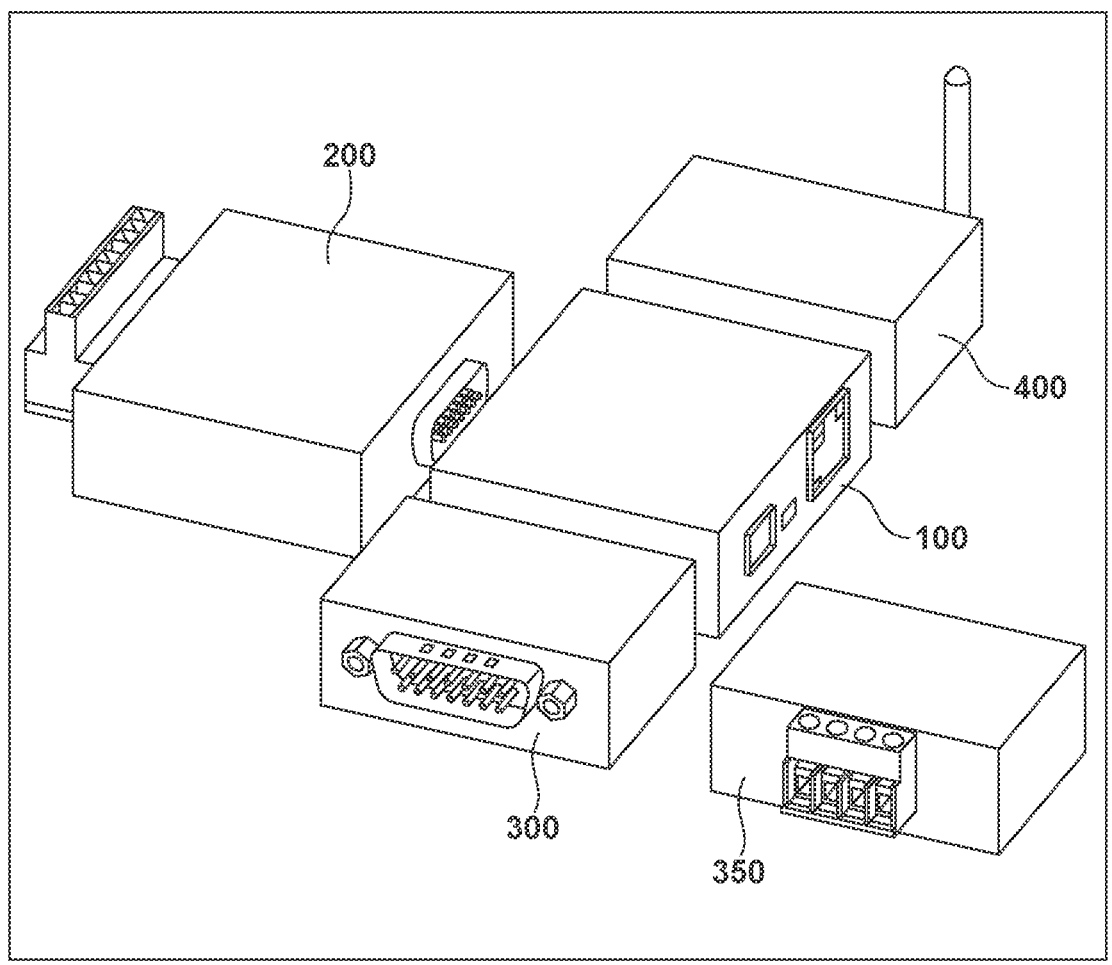
FIG. 2 is a view showing another configuration example of the system according to the embodiment.

An example of the system configuration according to this embodiment will be described with reference to FIGS. 1 to 3. The system is formed by, for example, a control device 100, a sensor box 200 which is a device controlled by the control device 100, an interface box 300, an IO box 500, a communication unit 400, and the like. The device controlled by the control device 100 may be a host device or a client device.

The control device 100 includes a processor (CPU 110) which is operated by, for example, a real-time OS. A memory 120 of the control device 100 is, for example, a rewritable memory such as a flash memory. The memory 120 stores the OS, a script, a system program called firmware, and the like, executed by the CPU 110. Here, JavaScript® or the like can be used as the script. The memory 120 may be built in the CPU 110, or may be arranged outside the CPU 110. The memories 120 may be arranged both inside and outside the CPU 110. The control device 100 further includes a RAM 130 used for temporary storage for the CPU 110 to perform processing. The RAM 130 may be built in the CPU 110, or may be arranged outside the CPU 110. The RAMs 130 may be arranged both inside and outside the CPU 110. The control device 100 further includes an interface units 140, 150, and 160 for inputting/outputting data and commands from/to external devices. In this embodiment, commands and data can be transmitted/received between each device and the control device 100 using, for example, the UART. The control device 100 may be configured to be capable of executing direct communication with a cloud by incorporating a communication module 170 capable of executing communication using, for example, an LTE standard such as NB-IoT or LPWA, or may include an interface unit capable of connecting to a wired LAN such as Ethernet®. When the wired LAN is used, the wired LAN may be connected to the Internet to execute communication with a server on a cloud 600. The power supply of the control device 100 may be a built-in battery, or the control device 100 may be supplied with power from the outside. When the control device 100 is operated by the built-in battery, in order to achieve power saving, the communication module 170 may be provided with a wake-up function such that the operation of the control device 100 is normally stopped but activated when communication such as a notification by an SMS is detected. Further, power saving may be achieved by using the real-time clock (RTC) of the CPU to wake up the control device 100 at a predetermined cycle or by activating/stopping the control device 100 in accordance with a signal from an external device.

The sensor box 200 includes a processor (CPU 210) for controlling the sensor box 200, and can execute a command from the control device 100. The CPU 210 executes instructions stored in firmware 215. An external device such as a sensor module is connected to a terminal 250 of the sensor box 200. A communication means such as the I²C or the SPI can be used for transmission and reception of data between the sensor box 200 and the sensor module. When a sensor that directly outputs analog data is connected to the sensor box 200, the analog data from the sensor may be converted into digital data by an A/D converter 220 and input to the CPU 210 via a bus such as the I²C. A D/A converter 230 is used for analog control of the sensor or the like. The A/D converter 220 or the D/A converter 230 built in the CPU may be used. The sensor module connected to the terminal 250 may be any kind of sensor module such as a temperature sensor, a pressure sensor, an optical sensor, a speed sensor, a rotary sensor, or an acceleration sensor. The terminal 250 may be directly connected to the sensor. The sensor box 200 may be provided with a sensor 240 therein. By connecting a plurality of sensor modules to the terminal 250, sensor data may be acquired from the desired sensor module in accordance with a command from the control device 100, or sensor data from the plurality of sensor modules may be multiplexed and provided to the CPU 210.

The IO box 500 includes a processor (CPU 510) for controlling the IO box 500, and can execute a command from the control device 100. The CPU 510 executes instructions stored in firmware 515. An external device is connected to a terminal 550 of the IO box 500. The IO of the processor (CPU 510) can be used to control input/output of a signal between the IO box 500 and the external device. The IO input/output may be performed via a relay or an optical MOSFET (photoMOS). The external device connected to the terminal 550 may be any kind of device such as a sound output device or a switch. The IO box 500 may incorporate an A/D converter 520 that converts an analog signal into a digital signal when the analog data is input from the terminal 550, or a D/A converter 530 for outputting a predetermined analog value. The A/D converter or the D/A converter built in the CPU 510 may be used. Data of the external device or data digitalized by the A/D converter 520 is input to the CPU 510 via the I²C or the like, processed by the CPU 510, and output to the communicably connected control device 100 via, for example, the UART. Data or commands may be transferred to/from the control device 100 using the SPI or the like.

The interface box 300 includes an interface compliant with, for example, RS-485, so that it is possible to connect a PLC, as an external device, that inputs/outputs data using RS-485 to the interface box 300 and execute communication with the control device 100 via the UART. The interface box 300 includes a processor (CPU 310) for control, and can execute a command from the control device 100. It is possible to control the PLC by giving a command from the control device 100 to the PLC via the interface box 300. In addition to the type compliant with RS-485, when RS-232C, RS-422, USB, or the like is used, a type compliant with the standard is prepared as the interface box 300.

The communication unit 400 includes, for example, an RF module 410 compliant with, for example, WiFi, Bluetooth®, or the like, and an antenna 420 for transmission and reception. The communication unit 400 can communicate with the control device 100 by the UART, and can execute wireless data communication with an external device using WiFi or the like. The communication unit 400 can be connected to a server on the external cloud 600 via a gateway 450 or via an access point or the like. The communication unit 400 includes a processor (CPU) for control, and can execute a command from the control device 100.

The devices connected to and controlled by the control device 100 has been described while taking the sensor box 200, the interface box 300, the IO box 500, and the communication unit 400 as examples, but the kinds of the devices are not limited to them.

An example in which various kinds of devices are connected to the control device 100 will be described with reference to FIG. 2. Each of the devices such as the control device 100, the sensor box 200, the interface box 300, and the communication unit 400 may have a structure that allows the device to be directly connected to the control device 100 by a connector. The control device 100 and each device may be directly connected by the connector having a predetermined shape, or may be connected using a cable. Each of the control device 100, the sensor box 200, and the like shown in FIG. 2 has a hexahedral shape, but the shape is not limited to this. Further, a device such as an interface box 350, that includes a terminal suitable for the use, may be separately prepared and connected. The control device 100 can identify or select a predetermined device using, for example, an IO port shown in FIG. 3. By being connected to the sensor box 200 and the interface boxes 300 and 350, the control device 100 can flexibly input/output data between the control device 100 and the device and the external device connected to the device.

In order to prevent an incorrection connection, as the connectors used for physical connections between the control device 100 and the various kinds of boxes, connectors having different shapes can be used depending on the device, such as the sensor box 200, the interface box 300, the IO box 500, or the communication unit 400, connected to the control device 100. Alternatively, connectors having the same shape may be used. Data and commands may be exchanged in a common format between the control device 100 and each device using the UART. From the viewpoint of software, by defining common commands between the control device 100 and the devices, the software serves as the termination between the devices so that it becomes easy to replace or add the device.

Figure 3:
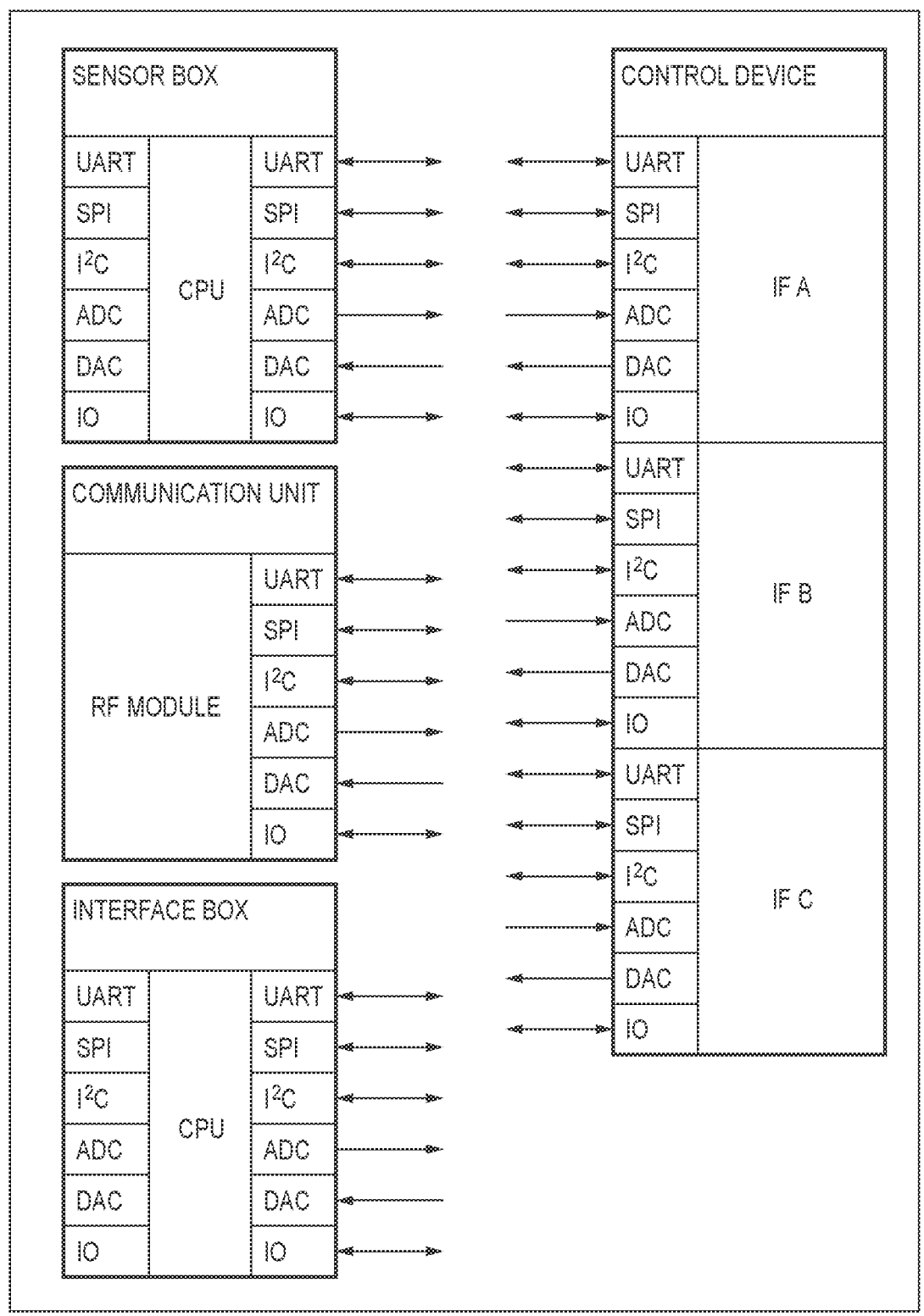
FIG. 3 is a view showing an example of interfaces between a control device and devices.

FIG. 3 shows an example of interfaces used for communication between the control device 100 and the devices connected to the control device 100. The UART is used for data and commands. The SPI and the I²C are mainly used for communication with a sensor module, but can also be used for data and command communication. The ADC (A/D Converter) is used for an input or output of the A/D converter for analog control of the sensor or the like. The DAC (D/A Converter) is used for an input or output of the D/A converter for analog control of the sensor or the like. The IO port is a General Purpose IO (GPIO) used for device identification, an input from an external switch, control of the CPU of the device, and the like. By making the signals between the respective devices and the control device 100 electrically common in this manner, the interface between the control device 100 and the other device can be made common and easy to handle. Each of the circuits of the control device 100 and the device is directly or indirectly connected to the IO port or the like. Examples of the indirect connection are a connection via a gate, a connection via a switch, and a connection via a coupler. The indirect connection can prevent application of an excessive voltage to the CPU, so that the CPU can be protected.

[Example of Device Control 1. Example of Firmware Update]

Figure 4:
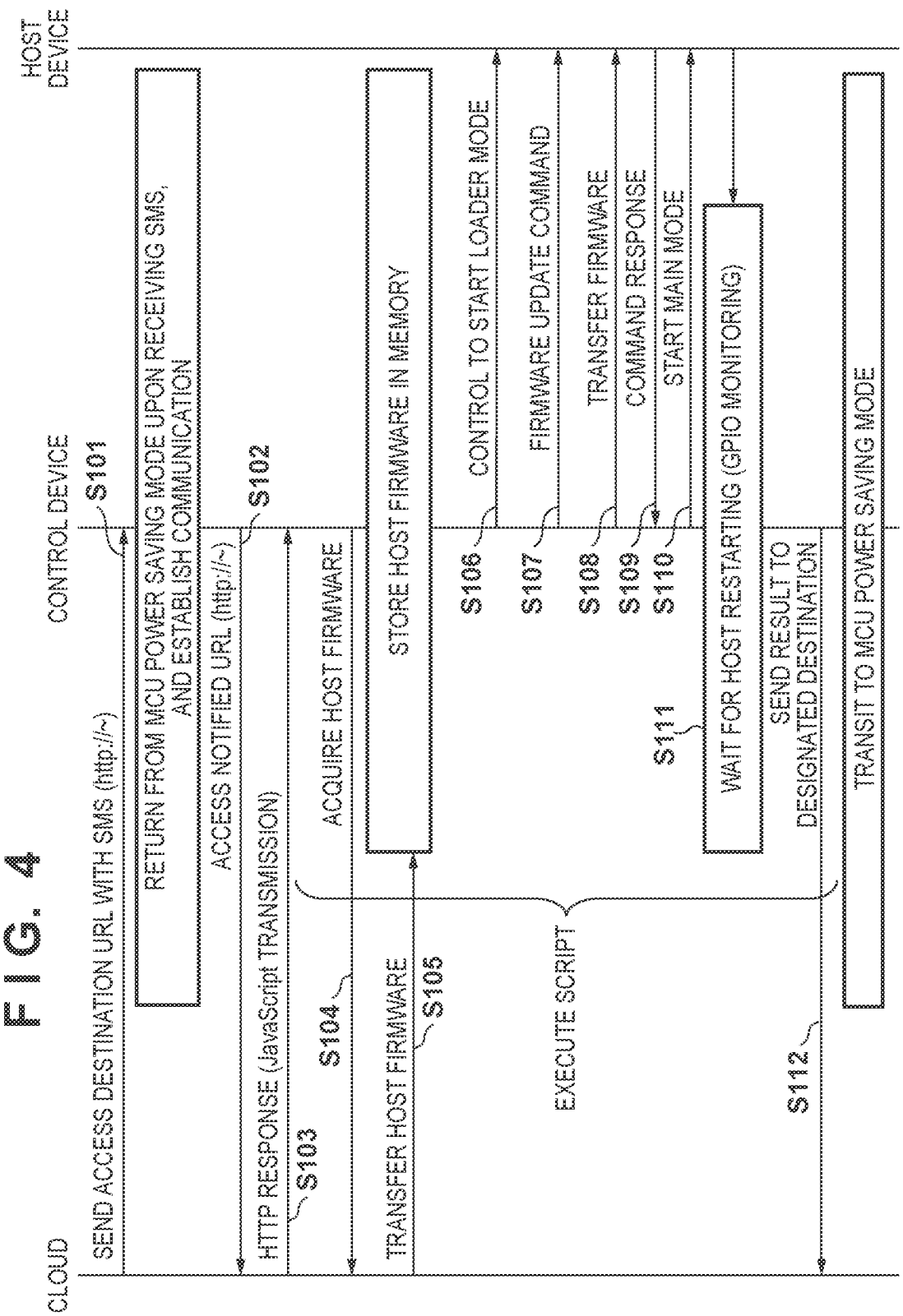
FIG. 4 is a sequence chart showing an example of firmware update.

With reference to FIG. 4, update of the firmware of the device such as the sensor box 200 or the interface box 300 will be described here.

Taking the sensor box 200 as an example of the device, an example of updating the firmware 215 of the sensor box 200 by the control device 100 will be described. When it becomes necessary to update the firmware of the sensor box 200, an instruction including a URL indicating the acquisition source of a script required for the update is notified from the cloud 600 to the control device 100 using an SMS (short message) or a PUSH notification (S101). This instruction may be given by a user, for example, when the user wants to update the firmware since the user has changed a device inside the sensor box 200. Further, the instruction may be given when the manufacturer of the sensor box 200 wants to update the firmware.

The control device 100 receives the SMS message storing the URL via the communication module 170, extracts the URL from the message, and accesses the notified URL (S102). Although the message stores the URL in the following description, instead of storing the URL in the message, the URL may be stored in the control device 100 in advance. In this case, the message may store an identification code instead of the URL and be transmitted, and the URL in the control device 100 may be selected and accessed based on the identification code in the received message. In response to the access, the HTTP server (not shown) accessed by the control device 100 transmits, as an HTTP response, a script for update to be executed by the control device 100 (S103). By using the service provided by the cloud, the user can create and store, in advance, the script for controlling rewriting of the firmware in the designated URL in the cloud. The control device 100 stores the script included in the received HTTP response in the memory 120. No script may be stored in the memory 120 of the control device 100 in the initial state. The new script may be overwritten on the old script stored in the memory 120. The capacity of the memory for storing the script may corresponds to the script to be executed by the control device 100, and it is unnecessary to prepare the capacity for storing a plurality of scripts.

By executing the script, the control device 100 can access the URL included in the script, and the control device 100 can request the new firmware of the sensor box 200 from a server (not shown) on the cloud 600 (S104). In response to the request, the server on the cloud 600 transfers the firmware to the control device 100 (S105). The control device 100 stores the firmware received from the server in the memory 120 or 130. Further, the CPU 110 executes the script to set the CPU 210 of the sensor box 200 in a loader mode. The loader is a program for rewriting, by the CPU, the firmware stored in the flash memory. The loader mode is a mode in which the loader is started. The operation to switch the CPU to the loader mode differs depending on the type of CPU, but the switching by hardware pin control of the CPU will be described below as an example. Switching to the loader mode can be executed, for example, by changing the reset pin of the CPU from L level to H level and resetting the CPU 210 while the mode pin of the CPU 210 is set in L level. In the CPU 210 set in the loader mode, the loader is started and a state in which rewriting of the firmware 215 is enabled is set (S106). The order of transfer of the firmware from the cloud 600 to the control device 100 and control for starting the loader and setting the state in which the firmware can be written may be reversed. The mode pin and reset control of the CPU 210 can be performed from the TO port of the control device 100.

As will be described later, the control for starting the loader differs depending on the type of the CPU 210 of the sensor box 200. Accordingly, a script suitable for the model of the CPU to undergo rewriting is prepared in the server on the cloud 600. The script can be prepared by the user in advance at a predetermined URL. Since a different script may be required depending on the type of CPU or the like, it is preferable to prepare a control script as a template according to the specification such that the user can create the script.

When the loader is started, a startup status is output on the TO port of the sensor box 200. After confirming that the startup status has been output, that is, confirming that the loader has been started, the control device 100 transmits a DL command indicating the start of transfer (DL) of the firmware (S107). The CPU of one type confirms the start by the control device 100 transmitting a confirmation command to the sensor box 200 via the UART and obtaining an OK response. Further, depending on the type of CPU, the control device 100 can transmit a DL command without confirming the status but after a certain elapse of time from the reset. The sensor box 200 that has received the DL command transmits, to the control device 100, an OK response indicating that the preparation is completed. After receiving this OK response, the control device 100 transfers the firmware (S108). When the firmware is transferred and the rewriting is completed, a command response is transmitted from the sensor box 200 (S109). When the command response is received (S109), the control device 100 changes the reset pin from L level to H level while the mode pin of the CPU 210 is set in, for example, H level, thereby switching the CPU 210 of the sensor box from the loader mode to the main mode in which the program is executed (S110). Thereafter, by monitoring the JO port, the control device 100 confirms that the main mode of the sensor box 200 has been started (S111). If it is confirmed that the main mode has been started, the control device 100 notifies the server of the cloud 600 of a report indicating the completion or failure of rewriting of the firmware (S112).

Figure 5:
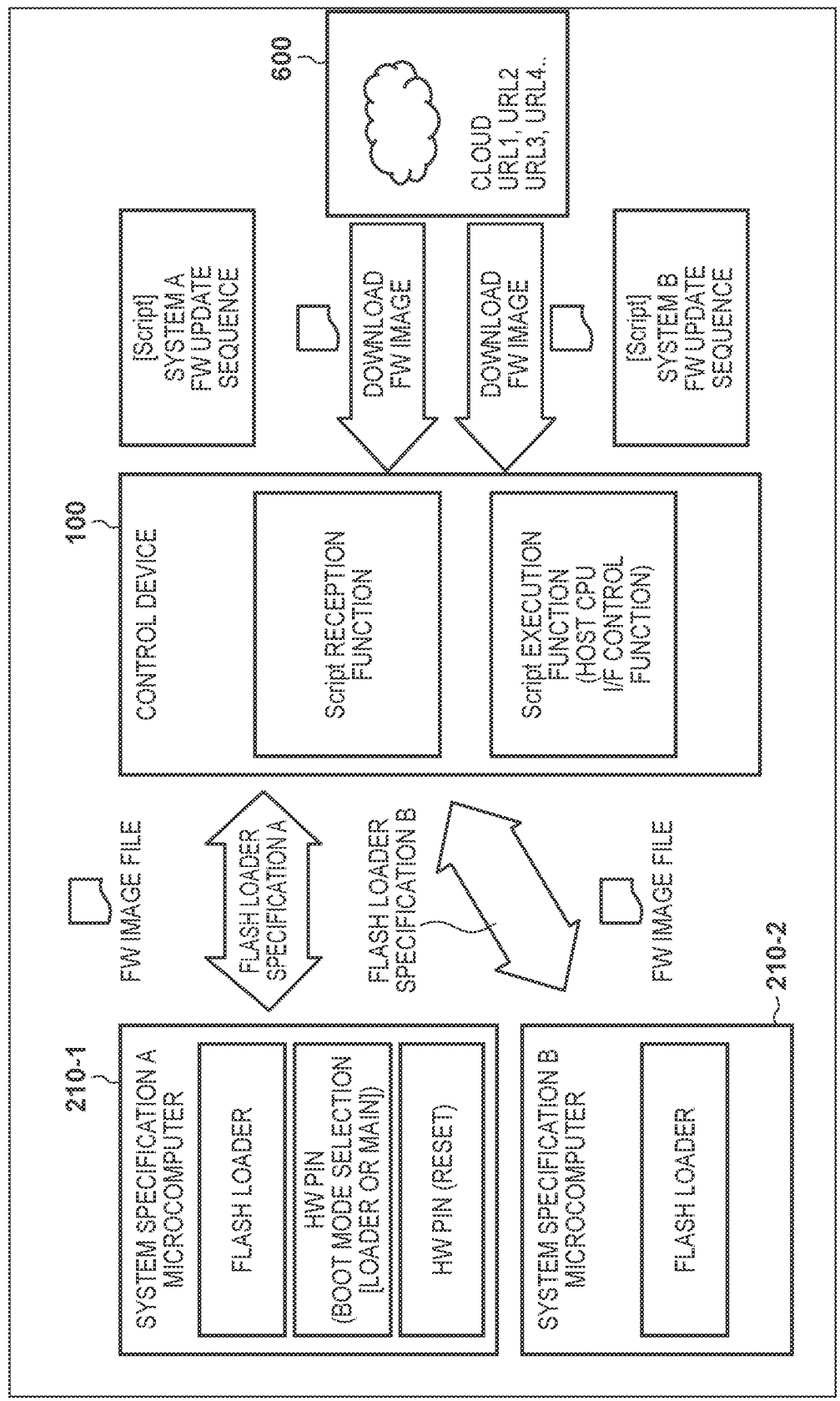
FIG. 5 is a view showing an example of firmware update for each of different specifications.

Next, with reference to FIG. 5, the loader start operation in each of devices, whose loaders of CPUs are started in different methods, will be described. The methods of starting the loaders will be described for a CPU of the specification A type and a CPU of the specification B type as examples. Specification A: a type in which the loader mode is set by controlling the hardware pins (for example, the mode pin and the reset pin) of the CPU to start the loader. When this type of CPU is used, the pins, such as the mode pin and the reset pin, of the CPU required for rewriting are connected to a predetermined IO port of the connector of the device connected to the control device 100. Specification B: a type that can be set to start the loader of the CPU by a command (software). When this type of CPU is used, the pin of the CPU for inputting a command required to start the loader is connected to a predetermined communication port such as the UART of the connector of the device. Here, the command for starting the loader of the CPU differs depending on the specification, but it is possible to cope with any command by rewriting the script.

As has been described above, the location indicated by the URL stored in the message such as the SMS transmitted by the instruction of the user or the like includes a predetermined storage location in the HTTP server. A predetermined script is transmitted to the control device 100 from the URL accessed by the control device 100. Therefore, as for the URL stored in the message, the acquisition source can be written separately, such as URL1 in a case of the specification A and URL2 in a case of the specification B. If the CPU built in the sensor box 200 connected to the control device 100 is the specification A, the control device 100 accesses the instructed URL1, receives a script A in which a system A FW update sequence for updating the specification A is described, and stores the script A in the memory 120. The control device 100 (CPU 110 thereof) executes the received script A, and controls the mode pin and the reset pin of the CPU 210 to switch it to the loader mode (S106). The hardware pins are controlled by outputting a predetermined level from the corresponding IO port of the control device 100 to each of the mode pin and the reset pin of the CPU 210 connected to a predetermined pin of the connector of the sensor box 200. If the CPU is the specification B, the control device 100 accesses the instructed URL2 and receives a script B in which a system B FW update sequence is described. The CPU 110 of the control device 100 executes the received script, and transmits a command to the CPU 210 to start the loader of the CPU 210 of the sensor box 200.

The memory 120 of the control device 100 need only be capable of storing a script in which a FW update sequence for the CPU of the device whose firmware is to be updated is described, and need not store a plurality of scripts for controlling a plurality of microcomputers of different specifications. Further, the script may be stored on the server where the user can rewrite the script. Then, even if the device such as the sensor box 200 is changed or the CPU is changed, the user can rewrite the script to cope with the update of the firmware.

This embodiment can also cope with a case in which the user wants to selectively use pieces of firmware between, for example, when the user wants to perform control using an application program having a basic function and when the user wants to use an application program having an extended function. For example, a firmware update sequence required to execute the basic function is prepared at URL3 as an access destination, and a firmware update sequence required to execute the extended function is prepared at URL4. The URL included in the SMS message or the like to the control device 100 is used as the URL of the script corresponding to the firmware required by the user. Thus, the control device 100 can obtain and execute the script, and can obtain the desired firmware and rewrite the firmware of the sensor box 200.

Rewriting of firmware has been described while taking the sensor box 200 as an example, but the device connected to the control device 100 is not limited to the sensor box 200, and any kind of device such as the interface box 300 may be connected.

In the present invention, even in a location where many kinds of devices are used, the control device 100 need not store a plurality of kinds of firmware and rewriting procedures. As for a change of the device connected to the control device, a script for rewriting firmware is stored in a predetermined location in the cloud accessible by the control device 100. This makes it easy to flexibly cope with the change of the device or the like. Further, by giving an instruction using an SMS or a PUSH notification, it is possible to rewrite the pieces of firmware of a large number of devices all at once.

[Example of Device Control 2. Example of Control by Command]

Figure 6:
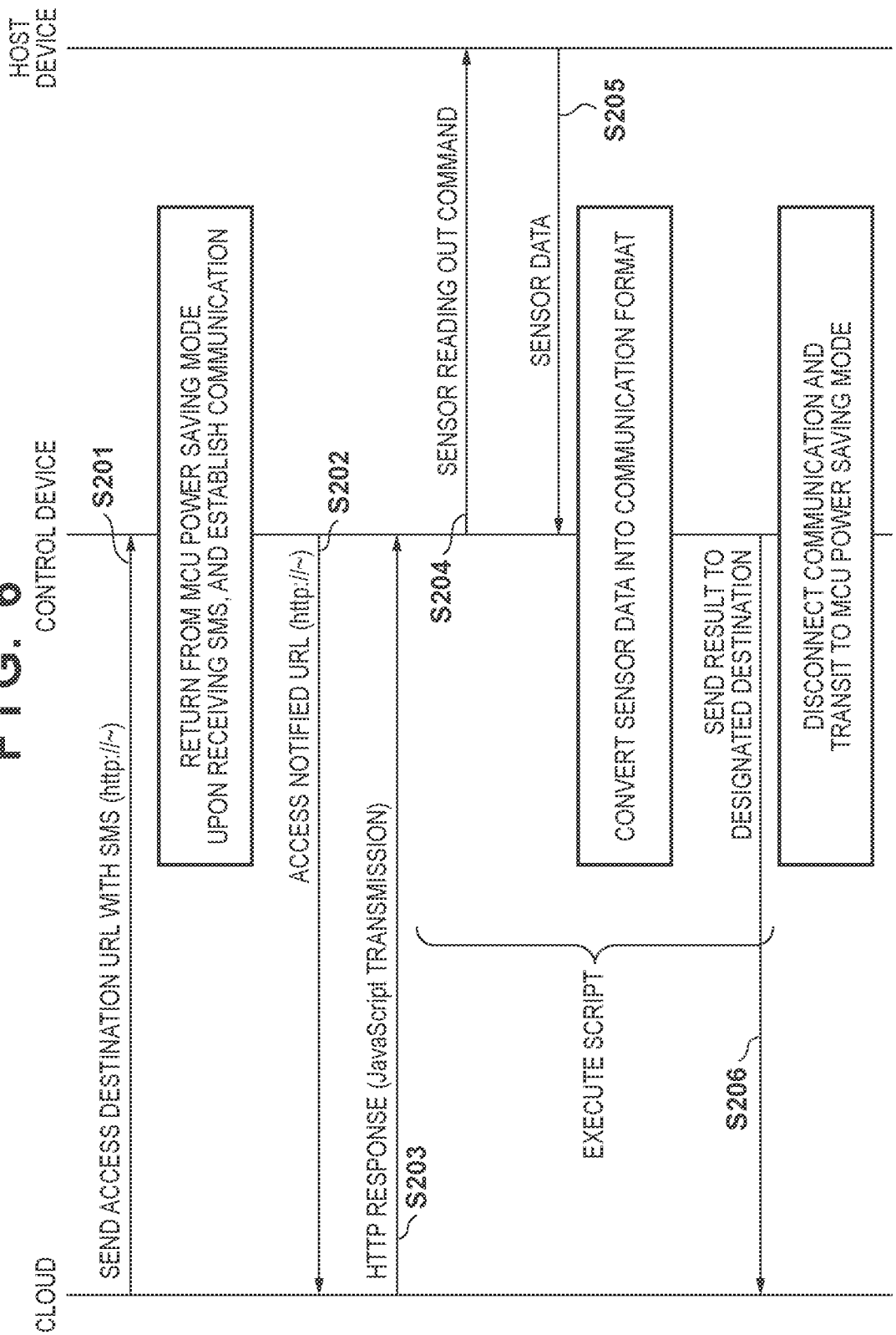
FIG. 6 is a view showing an example of a command operation according to the embodiment.

Next, with reference to FIG. 6, an example will be described in which a command is transmitted from the cloud 600 to the device to cause the device to execute the command and a response is received in the cloud 600.

The sensor box 200 to which a sensor module is connected will be described as an example of the device. A script for controlling the acquisition of data from the sensor box 200 is stored in a predetermined URL. When it is desired to obtain data from the sensor box 200, an instruction message including the predetermined URL is transmitted to the control device 100 using an SMS, a PUSH notification, or the like (S201). The instruction may be given by a user who wants to obtain sensor data, or may be given by a data collection server on the cloud 600. The control device 100 receives the message storing the URL via the communication module 170, extracts the URL from the message, and accesses the notified URL (S202). In response to the access, the accessed HTTP server (not shown) on the cloud 600 transmits, to the control device 100, a script for acquiring data from the sensor box 200 as an HTTP response (S203). The control device 100 stores the received script in the memory 120. The script may be overwritten in the memory 120. The control device 100 executes the script, and transmits a command to read out the sensor data to the sensor box 200 (S204). The CPU 210 of the sensor box 200 receives the command, performs processing of acquiring the instructed data from the sensor module, and transmits the sensor data to the control device 100 (S205). The control device 100 performs processing of converting the received sensor data into a predetermined communication format, and transmits the result of processing the data to the URL instructed by the script (S206). A server on the cloud designated as the transmission destination by the URL may collect the data and perform analysis.

The acquisition of sensor data from the sensor box 200 has been described as the example, but it is also possible to control the interface box 300. In order to obtain a script for controlling the interface box 300, a URL where the script is stored is transmitted to the control device 100 using an SMS or the like to cause the control device 100 to acquire the script from the cloud 600. By the control device 100 executing the script, a command is transmitted from the control device 100 to the interface box 300, and the interface box 300 is controlled. Further, if the sensor box 200 and the communication unit 400 are connected to the control device 100, it is also possible to, by performing control using a script, transmit sensor data acquired from the sensor box 200 to the communication unit 400 and transmit the sensor data to an external device via the communication unit 400.

The user creates a script for controlling a device such as the sensor box 200 via the control device 100 and stores the script in a predetermined URL in the cloud. By transmitting, to the control device 100, an instruction to receive the script using an SMS or the like storing the URL, it is possible to control the device or collect data.

As has been described above, in the present invention, the control device 100 need not store the control procedure of the device in advance, and can easily cope with a change of the kind of device to be used. The user can flexibly control the device by rewriting the script stored in the cloud. Therefore, software dedicated to a specific device becomes unnecessary. When it is desired to change the sensor type or firmware version, replace hardware such as an actuator, or collect data under a condition different from the condition initially set by the user, or when the user wants to change the control of the device, the control can be easily changed. Further, even if the user is remote, the device can be easily controlled using an SMS, a PUSH notification, or the like.

[Example of Device Control 3. Example of Data Communication]

Figure 7:
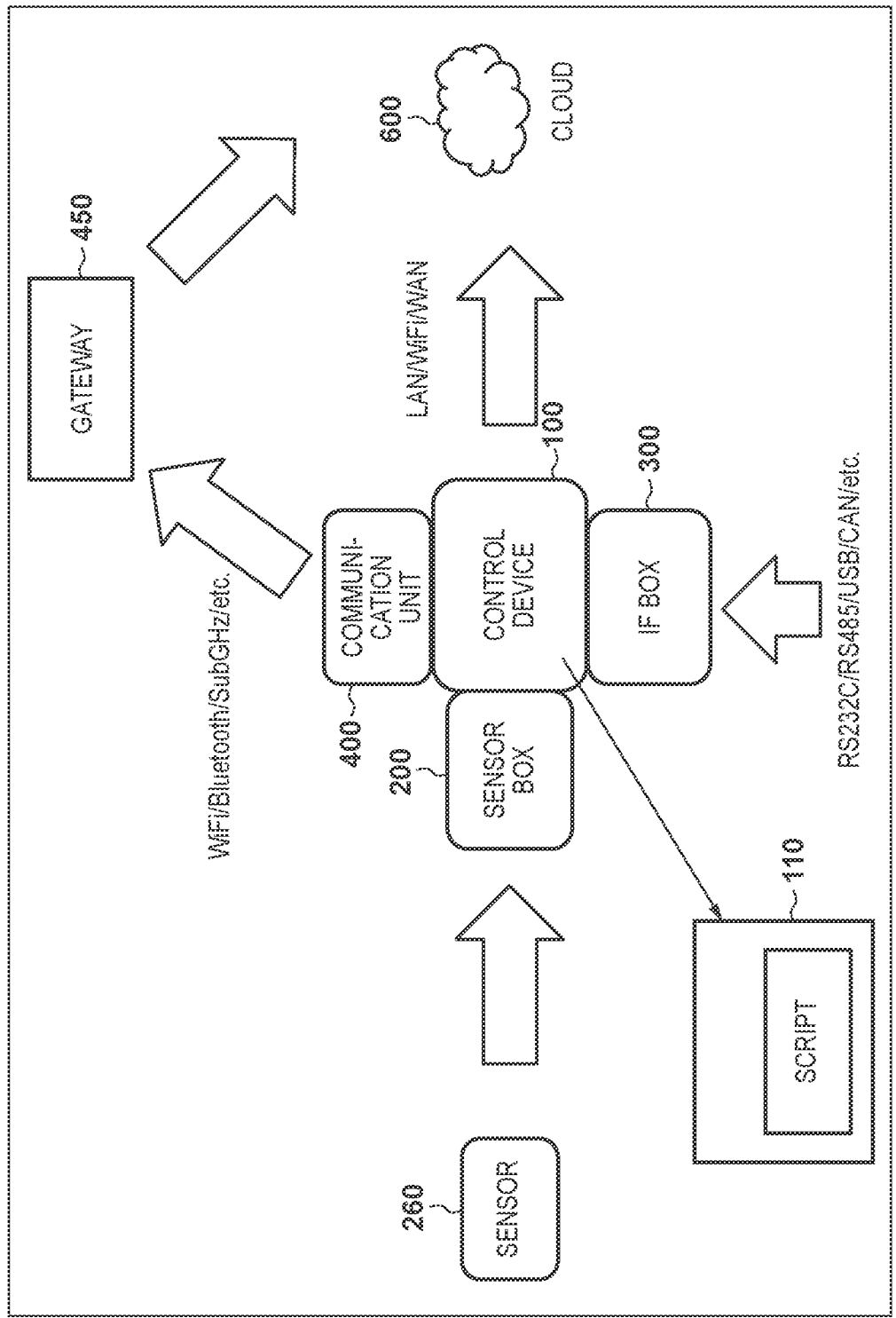
FIG. 7 is a view showing still another configuration example of the system according to the embodiment.

With reference to FIG. 7, communication between each of a plurality of devices and the control device 100 and control of the devices will be described. FIG. 7 shows an example in which the sensor box 200, the interface box 300, and the communication unit 400 are connected to the control device 100. The control device 100 receives an instruction to receive a script, accesses a URL included in the instruction, and obtains the script. By the CPU 110 of the control device 100 executing the script, it is possible to acquire sensor data from the sensor box 200, control an external device via the interface box 300 to acquire data, or communicate with a server on the external cloud 600 via the communication unit 400.

Figure 8A:
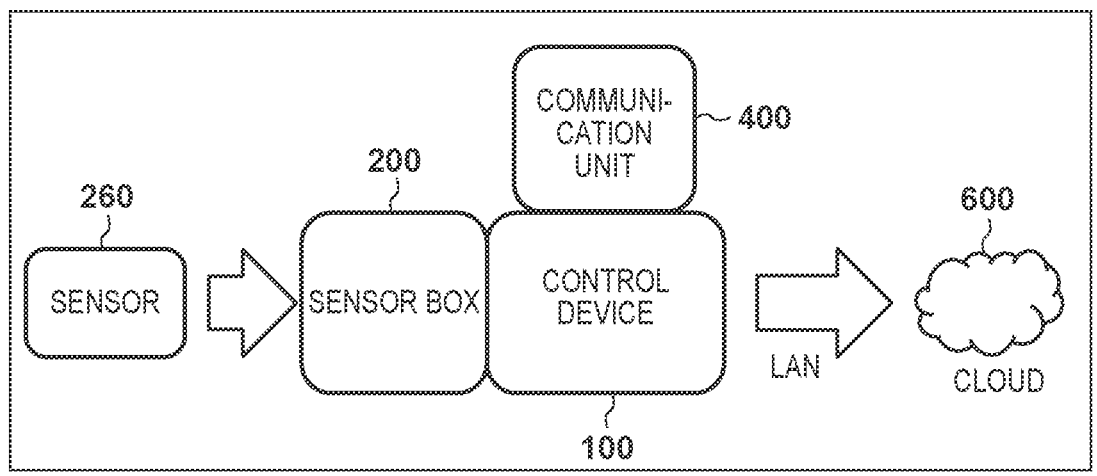
FIG. 8A is a view showing still another configuration example of the system according to the embodiment.
Figure 8B:
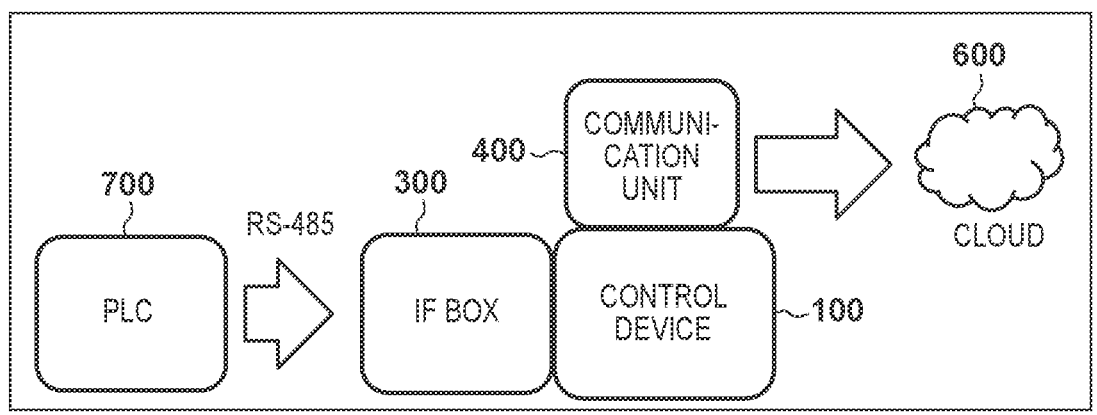
FIG. 8B is a view showing still another configuration example of the system according to the embodiment.
Figure 8C:
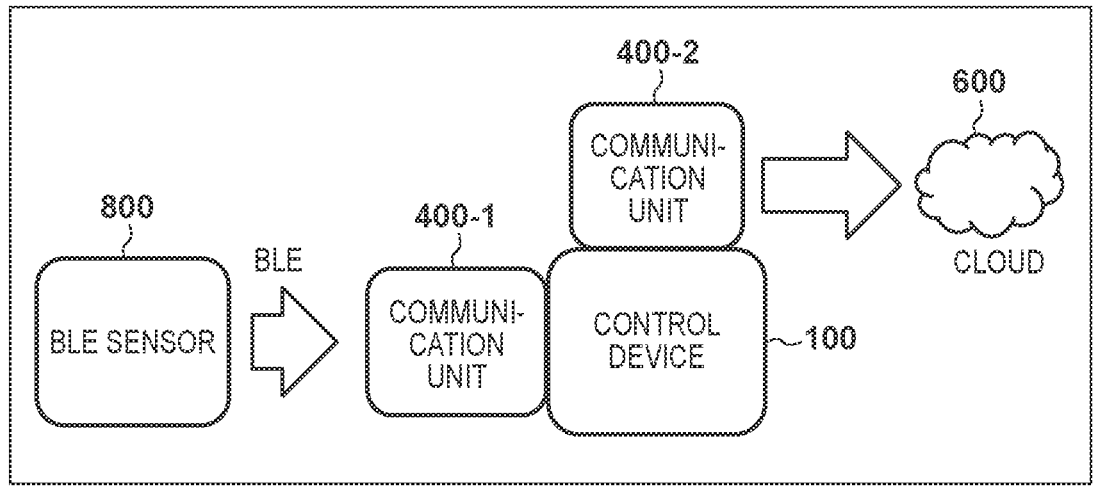
FIG. 8C is a view showing still another configuration example of the system according to the embodiment.

With reference to FIGS. 8A to 8C, an example of use of the device by the control device 100 will be described. FIG. 8A shows an example in which the sensor box 200 and the communication unit 400 are connected to the control device 100. In this example, sensor data from a sensor module 260 can be acquired by the sensor box 200 and transmitted to the external cloud 600 by the communication module 170 of the control device 100.

A script for controlling the operation of the control device 100 is stored in a predetermined location in the cloud indicated by a URL. First, the control device 100 receives a notification to acquire the script for controlling the operation by an SMS, a PUSH notification, or the like. The control device 100 accesses the URL of the acquisition source stored in the message, acquires the script stored in the location indicated by the URL, and stores the script in the memory 120. The script may be overwritten in the memory 120. The control device 100 executes the script stored in the memory 120. The sensor module 260 may be connected to the SPI terminal or the I²C terminal of the sensor box 200. Analog data or the like from the sensor are input to the ADC (A/D Converter) terminal. If sensor control or the like using an analog signal is required, the sensor module 260 is connected to the DAC (D/A Converter) terminal. The sensor box 200 and the control device 100 are connected using the UART and the General Purpose IO ports. The UART can be used for command and data communication. The General Purpose IO can be used for identification and control of the sensor box. The control command to the sensor box 200 can be defined to be specific to the sensor. The control includes, for example, readout of sensor data, setting of sensor conditions (sampling cycle, a change of the measurement range, or the like), execution of calibration of the sensor, selection of the sensor, instruction of various types of operations for processing in the sensor box 200, selection or setting of the processing algorithm for sensor data such as data smoothing or integration, and the like. By executing the script, the control device 100 selects the sensor box 200 and issues a control command to the sensor box 200. In accordance with the control command, the sensor box acquires sensor data from the sensor module 260 via the I²C. The analog data from the sensor may be acquired by digitizing it by the A/D converter 220. The sensor box 200 performs processing on the sensor data, and transmits the sensor data to the control device 100 by, for example, the UART. When the control device 100 receives the sensor data, the sensor data is converted into a format defined for transmission to the outside by the control device 100, and directly transmitted to the cloud 600 from the control device 100 via the LAN, or transmitted via the communication module 170.

FIG. 8B shows an example in which the interface box 300 for RS-485 and the communication unit 400 are connected to the control device 100. A PLC 700 is connected to the interface box 300 by RS-485. In this example, the PLC 700 is controlled by the control device 100, and obtained data is transmitted to the cloud via the communication unit 400.

A script for controlling the operation of the control device 100 is stored in a predetermined location indicated by a URL. First, the control device 100 receives an instruction message to acquire the script by an SMS, a PUSH notification, or the like. The control device 100 extracts the URL stored in the message, accesses the URL, acquires the stored script, and stores the script in the memory 120. The script may be overwritten in the memory 120. The control device 100 executes the script stored in the memory 120. The control device 100 and the interface box 300 may be connected by the UART for command and data communication, and the General Purpose IO. The General Purpose IO can be used for control and identification of the interface box 300. The control device 100 and the communication unit 400 can be connected by the UART, the SPI, the General Purpose IO, and the like. The interface box 300 can mutually convert data between the UART and RS-485. By executing the script, the PLC control data issued from the control device 100 is transmitted to the interface box, converted to RS-485 by the interface box 300, and transferred to the PLC 700. Data from the PLC 700 is converted to the UART by the interface box 300 and transferred to the control device 100. The data is converted into a format defined for transmission to the outside in the control device 100 and transmitted to the communication unit. The control device 100 controls the communication unit 400 by the script to transmit the data to the cloud 600. By executing the script, it is also possible to perform the control such that the data transmitted from the PLC 700 is acquired when the PLC 700 has become a predetermined state, and the data is transmitted to the cloud.

FIG. 8C shows an example in which a communication unit 400-1 receives data from a BLE sensor 800 in which a sensor is mounted on a BLE module capable of transmitting and receiving data by Bluetooth, and a communication unit 400-2 transmits the data to the cloud under the control of the control device 100. The communication unit 400-1 and the control device 100 are connected by the UART and the General Purpose IO. The UART is used for command control and data communication. The General Purpose IO is used for identification of the communication unit 400-1. The communication unit 400-2 and the control device 100 may be connected by the UART, the SPI, and the General Purpose IO. The communication unit 400-1 has a BLE communication function and can communicate with the BLE sensor 800. A script for controlling the operation of the control device 100 is stored in a predetermined location indicated by a URL. The control device 100 is notified of the acquisition source of the script by an instruction by an SMS or a PUSH notification. Based on the notification, the control device 100 receives the script from the cloud 600. The script is stored in the memory 120. The script may be overwritten on a previous script, if any. Then, the control device 100 executes the script and transmits a command to the communication unit 400-1. The command is transferred to the BLE sensor 800 and instructs to, for example, read out data from the BLE sensor 800. The data from the BLE sensor 800 is received by the communication unit 400-1 and transferred to the control device 100. The control device 100 converts the received data into a format for transmission to the outside and transmits it to the communication unit 400-2, and the communication unit 400-2 transmits the data to the external cloud 600. These control operations are executed by the control device 100 executing the script.

Also in this example, the control device 100 need not store the control procedure of the device in advance before receiving the control instruction, and even if the kind of device to be used is changed in the future, the control device 100 can perform control by only acquiring a script for controlling the device to be used. In addition, data collected by combining devices can be provided to an external device in various formats.

[Example of Device Control 4. Examples of Input and Output]

Figure 9A:
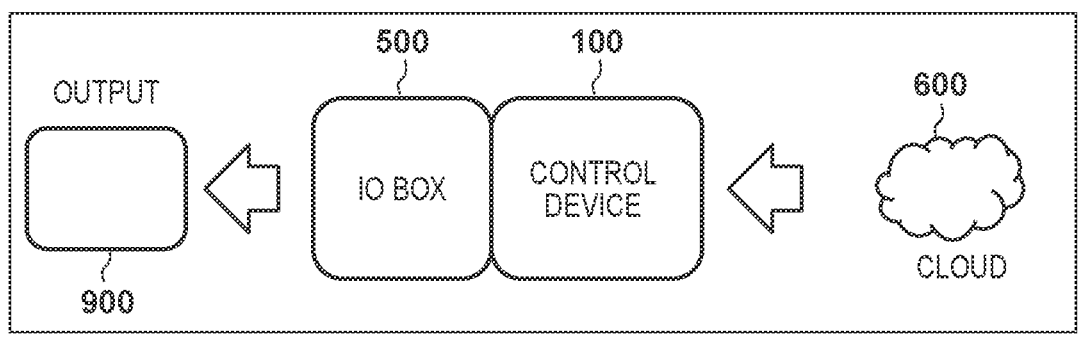
FIG. 9A is a view showing still another configuration example of the system according to the embodiment.
Figure 9B:
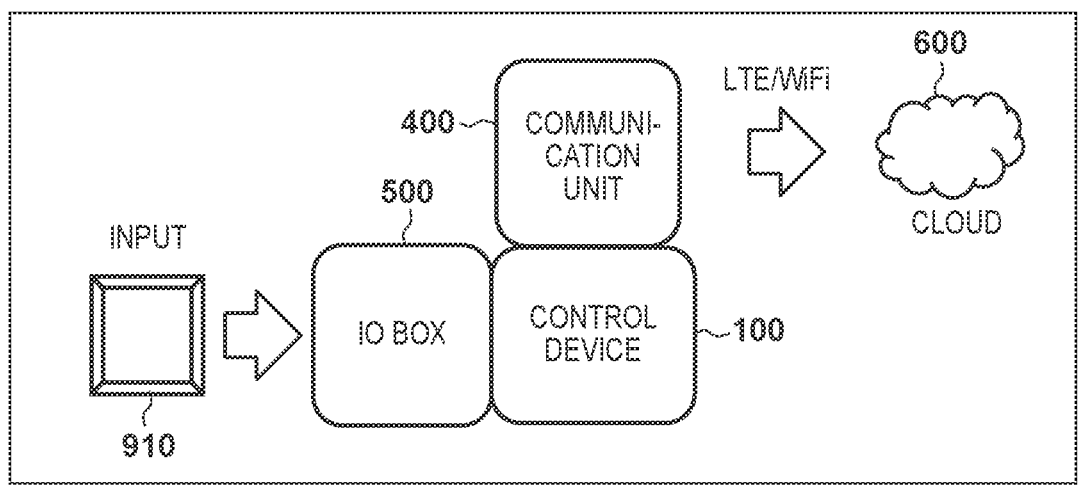
FIG. 9B is a view showing still another configuration example of the system according to the embodiment.

With reference to FIGS. 9A and 9B, examples of an input and an output using the IO box 500 will be described. In the example shown in FIG. 9A, the control device 100 and the IO box 500 with an output means 900 connected thereto are connected to each other. The output means 900 may be a sound output such as a buzzer or an optical output such as an LED. The IO box 500 and the control device 100 can be connected by the General Purpose IO. A script to be executed by the control device 100 is acquired from the cloud 600 in accordance with an instruction by an SMS or a PUSH notification as in the other examples. The control device 100 can execute the script to control the IO box 500 via the General Purpose IO and output sound or the like from the output means 900.

In the example shown in FIG. 9B, the control device 100 and the TO box 500 with a switch as an input means 910 connected thereto are connected to each other. The IO box 500 and the control device 100 are connected by the General Purpose IO. In this example, it is assumed that the switch 910 is connected to the General Purpose IO of the IO box 500, and input to the General Purpose IO of the control device 100 by passing through the inside of the IO box 500. A script to be executed by the control device 100 is acquired from the cloud 600 in accordance with an instruction by an SMS or a PUSH notification. The control device 100 can execute the script to directly monitor the state of the switch 910 connected to the IO box 500. Also in these examples, the received script may be overwritten and stored in the memory 120.

As has been described above, in the present invention, the control device 100 need not store a script for controlling a device in advance, and acquires the script from the cloud 600 each time it is instructed to acquire the script for control. By using a service provided by the cloud, a user can create and store a script in a predetermined URL, and flexibly execute control based on the script. Even if the kind of device to be used is changed in the future, if a script for controlling the device to be used is created and stored in the cloud, the control device 100 can control the device by acquiring the script in accordance with an instruction. Therefore, it is possible to execute control according to needs even if a large number of various kinds of devices are used.

The present invention also includes the use of the various control operations described above in arbitrary combination. For example, in a combination in which data is collected from the sensor box 200 and transmitted from the communication unit 400 to an external device by WiFi, it is possible to rewrite the firmware of the sensor box and the firmware of the communication unit.

The present invention is not limited to the above embodiments and various changes and modifications can be made within the spirit and scope of the present invention. Therefore, to apprise the public of the scope of the present invention, the following claims are made.

What is claimed is:

1. A control method for controlling, by a control device, a first device communicably connected to the control device, the control method comprising:

the control device initiating a rewrite of firmware of the first device by receiving, from outside of the first device and the control device, a first instruction indicating that the rewrite of the firmware of the first device is required, wherein the first instruction includes a first uniform resource locator (URL) indicating a location of a first acquisition source of a first script for rewriting the firmware of the first device;

the control device acquiring, by accessing the first URL, the first script, wherein the first script includes a second URL and a procedure for rewriting the firmware of the first device executed by the control device, the second URL indicates a location of a second acquisition source of new firmware, and the first URL and the second URL indicate locations that are outside of the first device and the control device; and the control device executing the first script to:
acquire the new firmware by accessing the second URL,
set a processor of the first device, by controlling a hardware pin of the processor in accordance with the procedure, to a loader mode in which the rewriting of the firmware is enabled,
after confirmation that the loader mode has started, transmit a first command, to the first device, indicating a start of transfer of the firmware,
after receiving from the first device a response indicating a completion of a preparation in the first device for rewriting the firmware in response to the first command, transfer the new firmware to the first device,
after receiving from the first device a second command indicating completion of a rewrite of the firmware of the first device to the new firmware, switch the processor from the loader mode to a main mode in which a program is executed by the processor, and
in response to confirmation that the main mode has been started, notify a designated destination of a report indicating a result of the rewrite of the firmware.

2. The control method according to claim 1, the control method further comprising:
receiving a second instruction to readout data from the first device, wherein the second instruction includes a third URL indicating a location of a third acquisition source of a second script for reading out the data from the first device;
acquiring, based on the third URL, the second script; and
by executing the second script, reading out the data from the first device.

3. The control method according to claim 2, wherein the data from the first device includes data of another device connected to the first device.

4. The control method according to claim 1, wherein the first instruction is given using an SMS (short message) or a PUSH notification.

5. The control method according to claim 1, wherein the second URL indicates the location of the second acquisition source of a predetermined firmware update file among a plurality of firmware update files that are available in the first device.

6. The control method according to claim 1, wherein the control method further comprising:
executing communication with an external device via a communication unit communicably connected to the control device.

7. The control method according to claim 1, wherein the control device receiving the first instruction from a server disposed in a network.

8. A control device comprising:
a first processor;
a memory; and an interface unit communicably connected to a first device,
wherein the first processor controls a rewriting of firmware of the first device, and the control of the rewriting of the firmware by the first processor comprises:
initiating the rewriting of the firmware of the first device by receiving, from outside of the first device and the control device, a first instruction indicating that the rewrite of the firmware of the first device is required, wherein the first instruction includes a first uniform resource locator (URL) indicating a location of a first acquisition source of a first script for the rewriting of the firmware of the first device;
acquiring, by accessing the first URL, the first script, wherein the first script includes a second URL and a procedure for rewriting the firmware of the first device, the second URL indicates a location of a second acquisition source of new firmware, and the first URL and the second URL indicate locations that are outside of the first device and the control device; and
the control device executing the first script to:
acquire the new firmware by accessing the second URL,
set a processor of the first device, by controlling a hardware pin of the processor in accordance with the procedure, to a loader mode in which the rewriting of the firmware is enabled,
after confirmation that the loader mode has been started, transmit a first command, to the first device, indicating a start of transfer of the firmware,
after receiving from the first device a response indicating a completion of a preparation in the first device for rewriting the firmware in response to the first command, transfer the new firmware to the first device,
after receiving from the first device a second command indicating completion of a rewriting the firmware of the first device to the new firmware, switch the processor from the loader mode to a main mode in which a program is executed by the processor, and
in response to confirmation that the main mode has been started, notify a designated designation of a report indicating a result of the rewrite of the firmware.

9. The control device according to claim 8,
wherein the first processor further controls readout of data from the first device, and the control of the readout of the data comprises:
receiving a second instruction to readout the data, wherein the second instruction includes a third URL indicating a location of a third acquisition source of a second script for reading out the data;
acquiring, based on the third URL, the second script; and
by executing the second script, reading out the data from the first device via the interface unit.

10. The control device according to claim 9, wherein the data from the first device includes data from another device connected to the first device.

11. The control device according to claim 8, wherein the first instruction is given using an SMS (short message) or a PUSH notification.

12. The control device according to claim 8, wherein the second URL indicates the location of the second acquisition source of a predetermined firmware update file among a plurality of firmware update files that are available in the first device.

13. The control device according to claim 8, wherein the first processor further executes communication with an external device via a communication unit communicably connected to the interface unit.

14. A system comprising:
a control device, and
a first device communicably connected to the control device, wherein
the control device performs a rewriting control of firmware of the first device, and the rewriting control includes:
initiating a rewrite of the firmware of the first device by receiving, from outside of the first device and the control device, a first instruction indicating that Han the rewrite of the firmware of the first device is required, wherein the first instruction includes a first uniform resource locator (URL) indicating a location of a first acquisition source of a first script for rewriting the firmware of the first device;
acquiring, by accessing the first URL, the first script, wherein the first script includes a second URL and a procedure for rewriting the firmware of the first device, the second URL indicates a location of a second acquisition source of a new firmware, and the first URL and the second URL indicate locations that are outside of the first device and the control device; and
the control device executing the first script to:
acquire the new firmware by accessing the second URL,
set a processor of the first device, by controlling a hardware pin of the processor in accordance with the procedure, to a loader mode in which the rewriting of the firmware is enabled, after confirmation that the loader mode has been started, transmit a first command to the first device, indicating a start of transfer of the firmware, after receiving from the first device a response indicating a completion of a preparation in the first device for rewriting the firmware in response to the first command, transferring the new firmware to the first device, after receiving from the first device a second command indicating completion of a rewrite of the firmware of the first device to the new firmware, switch the processor from the loader mode to a main mode in which a program is executed by the processor, and in response to confirmation that the main mode has been started, notify a designated destination of a report indicating a result of the rewrite of the firmware.

15. The system according to claim 14, wherein the control device further performs readout of data from the first device, and the readout of the data includes:

receiving a second instruction to readout the data from the first device, wherein the second instruction includes a third URL indicating a location of a third acquisition source of a second script for reading out the data;

acquiring, based on the third URL, the second script; and by executing the second script, reading out the data from the first device.

16. The system according to claim 15, wherein the data from the first device includes data from another device connected to the first device.

17. The system according to claim 14, wherein the first instruction is given using an SMS (short message) or a PUSH notification.

18. The system according to claim 14, wherein the second URL indicates the location of the second acquisition source of a predetermined firmware update file among a plurality of firmware update files that are available in the first device.

19. The system according to claim 14, the control device further comprising a communication unit communicably connected to an external device, wherein the control device communicates with the external device via the communication unit.

* * * * *